United States Patent [19]
Bender et al.

[11] Patent Number: 5,519,795
[45] Date of Patent: May 21, 1996

[54] MULTIPLE-SIZE OPTICAL FIBER IDENTIFIER

[75] Inventors: Ronald K. Bender; Larry R. Cox; Rutesh D. Parikh, all of Austin, Tex.

[73] Assignee: Minnesota Mining and Manufacturing Company, St. Paul, Minn.

[21] Appl. No.: 485,475

[22] Filed: Jul. 10, 1995

[51] Int. Cl.$^6$ ................................................ G02B 6/00
[52] U.S. Cl. ............................... 385/13; 385/32; 385/137
[58] Field of Search ............................. 385/13, 14, 32, 385/137, 31, 88

[56] References Cited

U.S. PATENT DOCUMENTS

| | | | |
|---|---|---|---|
| 4,586,783 | 5/1986 | Campbell et al. | 385/32 |
| 5,138,690 | 8/1992 | Cox | 385/137 |

*Primary Examiner*—John D. Lee
*Assistant Examiner*—Phan T. H. Palmer
*Attorney, Agent, or Firm*—Gary L. Griswold; Walter N. Kirn; Jack V. Musgrove

[57] ABSTRACT

An instrument for detecting optical signals in optical fibers of various diameters includes a piston adapted to urge a portion of an optical fiber against a light detector, the piston being movable between open and closed positions, and having at least two piston surfaces, one defining a first precision bend geometry adapted to urge a fiber of a first diameter against the detector, and another defining a second precision bend geometry adapted to urge a fiber of a second diameter against the detector. The piston is biased toward the detector by a spring mechanism which also applies a predetermined amount of pressure against the fiber. The piston includes a mandrel having the two piston surfaces, the mandrel further having a shaft such that it may be rotated about the shaft to present either one of the piston surfaces to the detector. Indicia may be provided on the mandrel shaft, or the body, to visually indicate which piston surfaces has been selected. The mandrel may be moved between the first and second orientations without disassembling the device, although such movement is allowed only when the piston is in a retracted position away from the detector. The mandrel includes detent means for releasably securing the mandrel in either one of the first and second orientations. A novel ambient light shield is also disclosed.

20 Claims, 5 Drawing Sheets

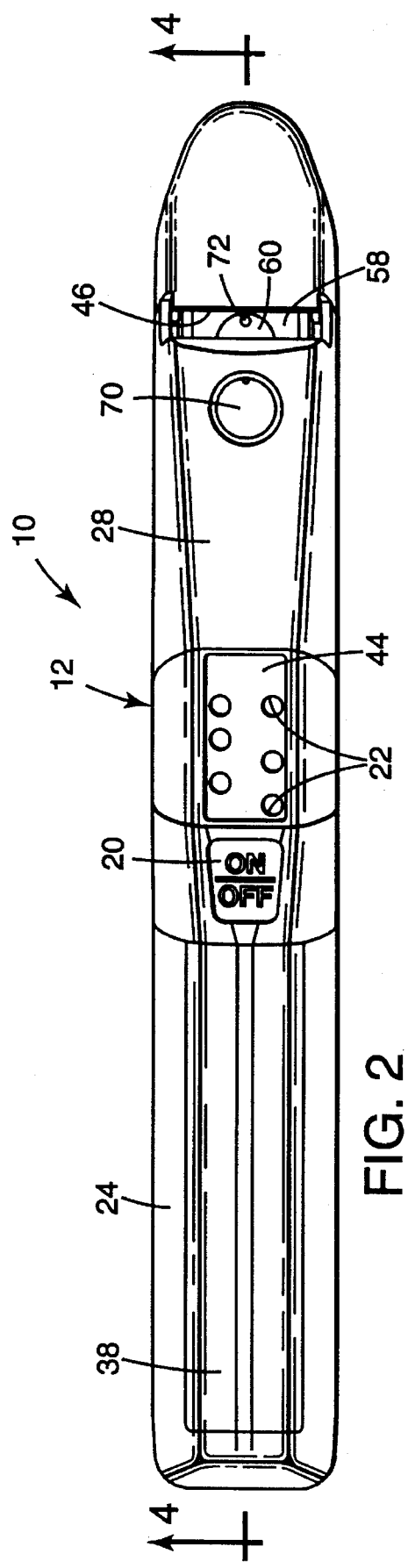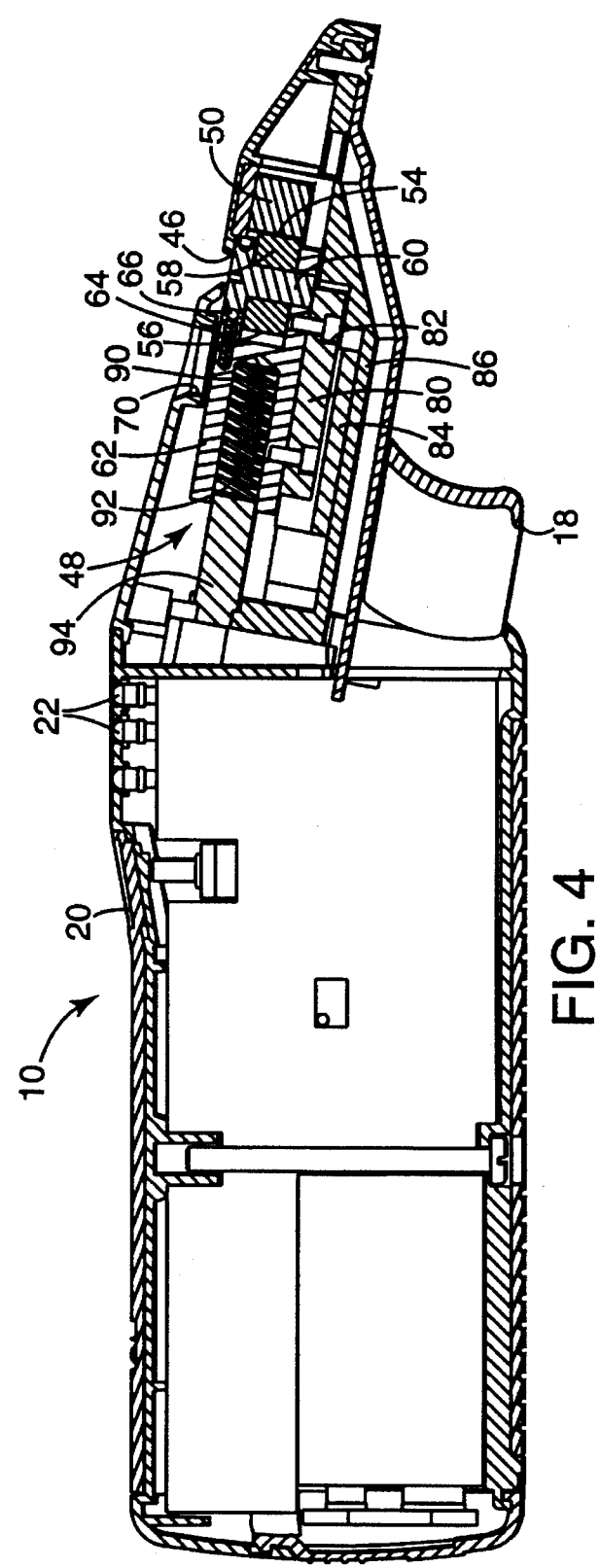

MULTIPLE-SIZE OPTICAL FIBER IDENTIFIER

BACKGROUND OF THE INVENTION

1. Field of the Invention

The present invention generally relates to devices for testing the operation of an optical fiber which may be carrying a telecommunications signal, and more particularly to such a device which is usable with differing sizes of optical fibers.

2. Description of the Prior Art

Optical fiber identifiers are known in the art, and are generally used to determine whether an optical fiber is carrying an optical signal, particularly a test signal. These devices are commonly used in the testing of fibers carrying telecommunications signals, including voice and data. Fiber identifiers operate by extracting a minute portion of the light signal at a small bend in the fiber. See U.S. Pat. No. 5,138,690 for a discussion of additional operating details as well as a list of prior art patents.

There are still many disadvantages with prior art fiber identifiers. Several of these relate to the use of an identifier for testing different sizes of fibers. Most identifiers are made to handle only a single type or size of fiber, particularly 250 μm. Other units which claim to handle all fibers (e.g., Noyes' OFI-200, or Wilcom's F6222) provide only clumsy solutions, and present additional technical problems.

For example, some devices designed for different types of fibers use a single piston to force the fiber against a detector head and consequently fail to meet industry (Bellcore) bend loss requirements for all of the different sizes. Excessive bend loss may cause line interruption as explained in the '690 patent. In those instruments where two or more pistons are used, the device must be partially disassembled to gain access to and replace the piston. Such devices still fail to maintain repeatable bend loss specifications due to lack of constant pressure on the fiber. In particular, user-dependent pressure (i.e., manual gripping) not only fails to sometimes further causes excessive bend loss.

Another problem associated with existing multiple size fiber identifiers is the fiber handling mechanism. The performance of these devices heavily depends on how the user installs the fiber in the device head. The user must also learn different techniques for installing different fibers, e.g., at different positions in the clip-on head mechanism.

Performance also depends greatly on ambient light leakage into the detector head of the device. Too much ambient light leakage not only limits sensitivity but further may cause false identification of a light signal on the fiber. The craftsperson might unwittingly cause damage to the fiber due to this false identification. In some devices ambient light shielding may be sufficient in darker environments, but the devices become useless in excessively bright conditions (e.g., sunlight or intense room light), limiting the real-life uses of the device. It would, therefore, be desirable to devise a fiber identifier which is easily used with fibers of differing sizes and which guarantees repeatable bend loss. It would be further advantageous if the unit was highly sensitive to low power signals in any ambient lighting conditions.

SUMMARY OF THE INVENTION

The present invention provides a multiple size optical fiber identifier allowing live identification and traffic testing of fiber optic lines without cutting the fibers or interrupting normal service, and is ideal for use during routine maintenance and line modification. One embodiment is particularly designed to handle 250 μm, 900 μm and 3 mm fiber diameters, as well as ribbon fiber (up to 12 count). The device generally comprises a body having a slot at a forward tip for receiving the optical fiber, a photodetector within the tip, next to the slot, and a piston located within the body for forcibly urging a portion of an optical fiber against the photodetector, the piston having at least two piston surfaces, one defining a first precision bend geometry associated with a first fiber diameter, and another defining a second precision bend geometry associated with a second fiber diameter. The piston is biased toward the detector by a spring mechanism which also applies a predetermined pressure against the fiber.

Means are provided to select one of the first or second piston surfaces to urge the portion of the optical fiber against the detector. In the preferred embodiment, the piston includes a single mandrel piece having the two piston surfaces, the mandrel having a shaft which may be rotated between a first orientation wherein the first piston surface faces toward the detector, and a second orientation wherein the second piston surface faces toward the detector. Indicia may be provided on the mandrel shaft, or the body, to visually indicate which of the first and second piston surfaces has been selected. The mandrel may be moved between the first and second orientations without disassembling the device, although such movement is allowed only when the piston is in a retracted position away from the detector. The mandrel includes detent means for releasably securing the mandrel in either one of the first and second orientations.

A novel light shield is also provided to minimize leakage of ambient light into the head assembly. This light shield includes a first strip of opaque, compressible foam attached to a first side of the detector, a second strip of opaque, compressible foam attached to a second side of the detector, a third strip of opaque, compressible foam attached to a first side of the piston, and a fourth strip of opaque, compressible foam attached to a second side of the piston, such that the third and fourth strips abut and conform against the first and second strips, respectively, when the piston is in the closed position. The third and fourth strips preferably have a cutouts at their forward ends, positioned such that the cutout abut the first and second strips on the detector. The third and fourth foam strips are preferably made of a softer material than the first and second foam strips.

This construction provides a fiber identifier which has very repeatable, non-intrusive bend losses of acceptable value for all fiber types and sizes, with sensitivity to extremely low power signals. The device is small (hand-held), easy to use and self-contained, eliminating training requirements, and is relatively low cost.

BRIEF DESCRIPTION OF THE DRAWINGS

The invention will best be understood by reference to the accompanying drawings, wherein:

FIG. 2 is a top plan view of the embodiment of FIG. 1; and

FIG. 4 is a cross-section taken along lines 4—4 of FIG. 2;

DESCRIPTION OF THE PREFERRED EMBODIMENT

Figure 1:
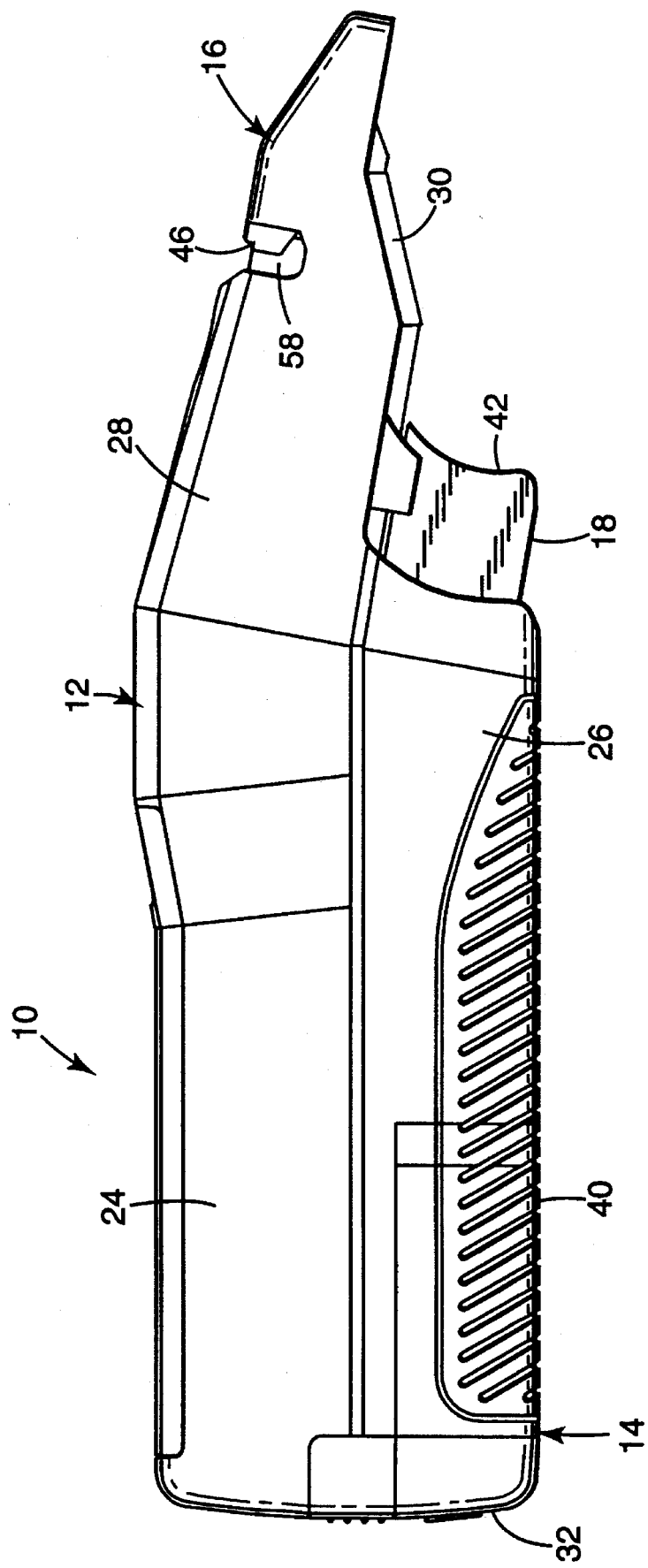
FIG. 1 is a side elevational view of one embodiment of the multiple size optical fiber identifier of the present invention, shown with the head assembly in a relaxed, closed position.

With reference now to the figures, and in particular with reference to FIGS. 1 and 2, there is depicted the exterior of one embodiment 10 of the multiple size, optical fiber identifier of the present invention. Fiber identifier 10 is generally comprised of a hollow body 12 having a handle portion 14 and a tip 16, a trigger 18, an actuation, or on/off button 20, and one or more annunciators 22. Body 12 may be constructed of any durable material, preferably an engineering polymer such as acrylonitrile butadiene styrene (ABS), polycarbonate, or acetal, although it could be a die cast, stamped, or machined metal such as aluminum. As further seen in FIG. 3, body 12 is comprised of a top case portion 24, a bottom case portion 26, a forward portion or fairing 28 and a wire guide plate 30. A removable cover 32 is also provided to allow replacement of a battery 34. Fiber identifier 10 may be connected to an external power supply, but it is of course advantageous to provide a battery within a compartment inside body 12. Top and bottom portions 24 and 26, fairing 28 and wire guide 30 may be attached by any convenient means, including the use of mechanical fasteners, adhesives, or sonic welding. Wire guide 30 has a ridge 36 along its underside forming an internal channel which accommodates electrical wiring within body 12. Rubber strips 38 and 40 are provided for manual gripping of handle 14, and a trigger grip 42 may be fastened over the end of trigger 18. A label 44 may be used to provide written information for each annunciator 22. The function of annunciators 22 is explained further below. Although the size of body 12 may vary greatly, it should be small enough to be held in one hand, and the preferred embodiment is about 22.5 cm long, 3.0 cm wide and 6.0 cm high.

Fairing 28 has a slot 46 for receiving a portion of the fiber under test, slot 46 being tapered toward an optical detector 50. The forward end of tip 16 is preferably tapered to facilitate separation of optical fibers amassed in a bundle so that a single one may be positioned in slot 46. In this manner, a fiber may be installed in identifier 10 using one hand, by simply scooping the fiber into the slot. The alignment slot geometry dictates that fibers of all sizes are aligned with the vertical center of the detector sensing area. This is accomplished by incorporating a V-shaped ramp or groove (i.e., the taper of the slot) that drives the fibers toward the apex of the V-groove as trigger 18 is released.

Figure 5:
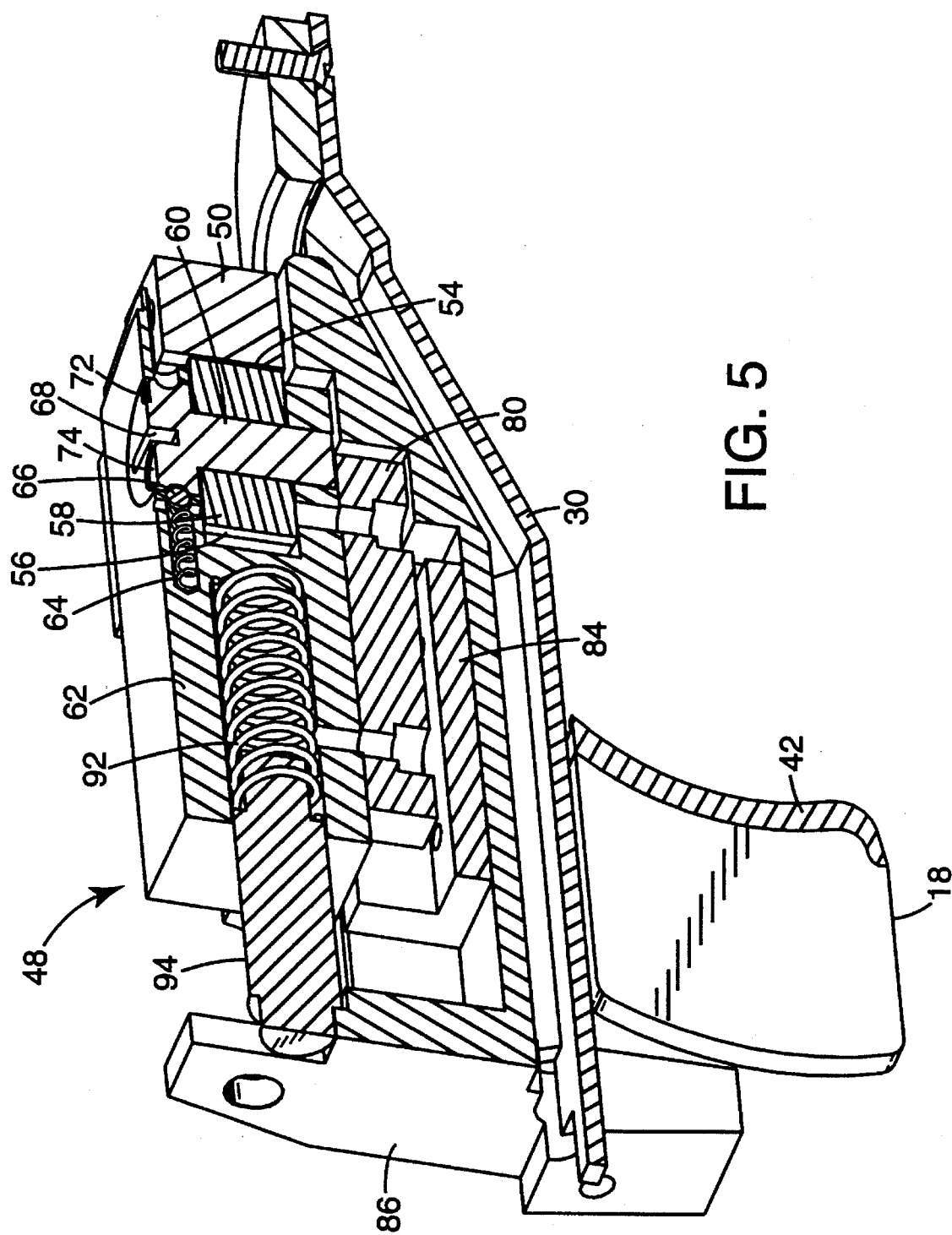
FIG. 5 is a perspective view with a partial sectional of the head assembly used in the fiber identifier of FIG. 1.

With further reference to FIGS. 4 and 5, the interior features of fiber identifier 10 are explained, particularly those of the head assembly 48 which clips onto the fiber and captures the escaping light, if any, at the resulting fiber bend. Detector block 50 and matching piston 52 define a precise geometry of the fiber bend. A precise bend radius on the piston surface is required to conform the fiber to the bend geometry and to optimize bend loss. In this embodiment, dual piston surfaces 54 and 56 are provided on a single mandrel 58 which, together with a mandrel shaft 60, form piston 52. One of the surfaces (54) is optimized for 250 µm fiber and another (56) is optimized for 900 µm fiber but, the 900 µm piston surface may also be used for 3 mm fiber. Due to cost considerations and performance requirements only two piston surfaces are provided in this embodiment, but those skilled in the art will appreciate that the present invention further contemplates a piston having three or more piston surfaces for other fiber sizes. The inventors have also constructed a piston having three mandrel surfaces for 250 µm, 900 µm and 3 mm fibers. In that embodiment (not shown), when the instrument detects no signal in a 250 µm using the 250 µm piston surface, and if the craftsperson intends on cutting such an apparently "dead" fiber, it is wise to first check the fiber also on the 900 µm piston surface. This bends the fiber at a sharper angle to increase sensitivity, and may cause line interruption, but this is preferred to the accidental cutting of a line thought to be dead.

Mandrel 58 is preferably constructed of a metallic material such as brass, and the three (or two) opposite sides are precisely machined to form separate, optimum bend geometries. A three surface mandrel preferably has one piston surface with a 5 mm radius of curvature and an 11° mandrel angle for the 250 µm fiber, another piston surface with a 3 mm radius of curvature and a 11° mandrel angle for the 900 µm fiber, and a third piston surface with a 2 mm radius of curvature and a 25° mandrel angle for the 3 mm fiber. It will be appreciated that these parameters were optimized for a particular type of fiber (Siecor/Corning SMF-28), and might change if optimized for other fibers. The typical range of radii is 2 mm–6 mm, with a mandrel angle in the range of 6°–25°.

Piston 52 pivots in a yoke 62 about shaft 60 and is kept in place using a locking spring 64 and detent ball 66. Shaft 60 has precisely machined holes or sockets for receiving ball 66 to ensure that the respective piston surfaces are repeatably positioned in the optimum position. A knob on the top of the piston is provided with a slot 68, to allow the user to change the piston orientation using a normal screwdriver, small coin or any similar implement. Fairing 28 has a hole 70 therein allowing direct access to shaft 60 and slot 68, so that the instrument may be changed for use with a different fiber type without disassembling body 12 or head assembly 48. The top of mandrel shaft 60 is marked with a small dot 72 indicating the side for small (250 µm) fiber, and a bigger dot 74 indicating the side for bigger (900 µm or 3 mm) fibers. Alternatively, an arrow or similar pointer may be formed or printed on the top of mandrel shaft 60 (see FIG. 6) and indicia provided on the outer surface of fairing 28 to indicate the proper position of the shaft, for example, by having three dots printed on fairing 28 at different locations around hole 70 with the associated numbers "250," "900" and "3" printed adjacent each dot.

Mandrel yoke 62, which is fastened to trigger 18 by means of, e.g., screws 76, is also mounted on a bearing assembly 78 which allows yoke 62 to slide toward and away from detector 50. Bearing assembly 78 includes a sliding carriage member 80 which is directly fastened to yoke 62 by, e.g., screws 82, and a base 84 which is fastened to a frame support 86 by, e.g., screws 88. Frame support 86 is in turn attached to top and bottom case portions 24 and 26 and body 12. The use of bearing assembly 78 provides for accurate alignment of piston 52 with detector 50 and improves the repeatability of measurements made with identifier 10.

As mentioned above, it is important to limit the amount of force applied to the fiber when held between piston 52 and detector 50. In the present invention, means are provided for carefully regulating the pressure on the fiber. Mandrel yoke 62 has a hole or bore 90 aligned with the sliding axis of bearing assembly 78, and a precision spring 92 is located therein. A spacer 94 abuts a wall on support frame 86 at one end and the other end backs up spring 92. Since trigger 18 acts only to retract or open head assembly 48, the force applied by piston 52 is determined solely by spring 92, thus providing a precise, repeatable load on the fiber. In the preferred embodiment, the approximate spring pressure is about 7.1 N (1.6 lbs). This construction overcomes the disadvantages noted with respect to prior art fiber identifiers, and provides repeatable, non-intrusive bend losses within industry specifications (less than or equal to 2 dB) for all fiber sizes (although with some colored fibers bend loss exceeds 2 dB depending on the manufacturer), with optimum sensitivity for each fiber type. The device is conveniently made small enough for hand-held use, may be constructed at a relatively low cost and, with battery 34, is completely self-contained.

The orientation of piston 52 can only be changed, i.e., to accommodate another fiber size, when head assembly 48 is in the open position, due to the location of hole 70 in fairing 28. The user must retract trigger 18 to locate slot 68 in hole 70 so that piston may be rotated. This prevents damage to the piston surfaces or detector 50, as well as preventing damage to any fiber which may be held by identifier 10 in its relaxed state. Fiber identifier 10 is shown in the relaxed, closed position in FIGS. 1–2 and 4–5.

Figure 3:
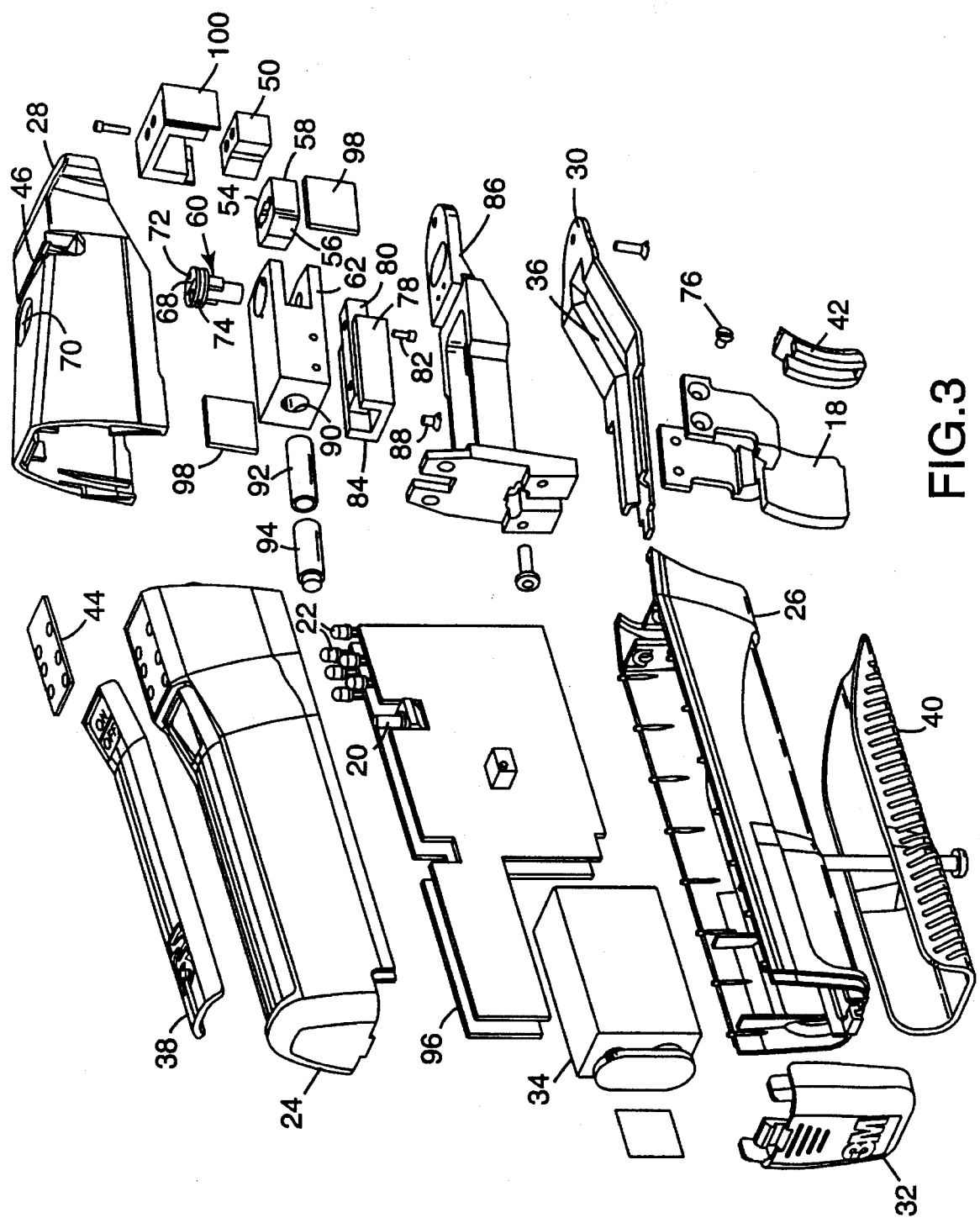
FIG. 3 is an exploded perspective view of the embodiment of FIG. 1.

One additional element seen in FIG. 3 is the printed circuit board (PCB) 96 which supports the electronic subassembly for fiber identifier 10. Annunciators 22 (e.g., light-emitting diodes) are supported by PCB 96, as is on/off button 20. Detector 50, the associated electronics, and annunciators 22 are similar to the corresponding components described in U.S. Pat. No. 5,138,690, but those components are generally extraneous to the primary aspect of the present invention which relates instead to the precise and repeatable positioning of multiple piston surfaces against a detector, to improve use on different sizes of fibers. One improvement has, nevertheless, been made to the detector system. As in the '690 patent, two PIN diodes (not shown) are mounted so as to receive light leaking from either direction out of the fiber. Depending on the direction of travel of the light signal, one of the PIN diodes will collect more light than the other. The electronic circuit built into the case (and powered by a single 9 volt alkaline battery), converts and measures both detector's current and compares it. Comparison indicates the direction of travel. Detector 50 preferably utilizes rectangularly-shaped photodiodes to maximize the surface area for collecting light and improve repeatability of measurements; such diodes are available from Germanlure Power Devices of Andover, Mass. (2.5 mm×3 mm dual detector assembly). Other modifications can be incorporated into the present invention, such as the actuation dampening of the '690 patent, or the sensors used to check the position of the piston as is also described in that patent.

An additional improvement in the design of fiber identifier 10 relates to leakage of ambient light into head assembly 48 during signal measurement. Two (opaque) foam pieces are provided on each side of detector 50 and piston 52, to effectively shield against ambient light leakage. The foam strips 98 used on the piston side, attached to the forward end of yoke 62, are sorer than the foam strips 100 used on detector side. When a fiber is installed in head assembly 48, foam strips 100 conform around the fiber. This arrangement leaves small gaps around the fiber through which ambient light leakage is still possible. Foam pieces 98 are mounted in such a way (on the outside of foam pieces 100) that they cover the interface gaps to stop the ambient light leakage. This two-layer, compressive foam structure provides a unique, simple and effective ambient light shield for the device.

The ease of use of fiber identifier 10 virtually eliminates training requirements. First, the piston surface is selected by retracting trigger 18 to expose slot 46 and rotating mandrel shaft 60 to the desired setting, indicated by one of the dots 72, 74, and properly aligned when detent ball 66 snaps into place in the corresponding concavity on mandrel shaft 60. Trigger 18 is again retracted to open head assembly 48 so that the fiber to be tested can be placed in slot 46. The fiber should lie flat in slot 46 at the bottom on both sides of tip 16. No special alignment is required for different fiber sizes. After placement of the fiber in slot 46, trigger 18 is released to close head assembly 48, imparting a precise bend to the fiber. Spring 92 provides constant pressure on the fiber, offering a repeatable and improved bend loss performance. If a signal is present, the device displays the same by energizing one of the annunciators 22, and further indicates the signal's direction of travel. The device can also indicate other characteristics of the signal, for example, whether it is a test signal that has been injected into the fiber at a remote location. After testing is completed, trigger 18 is retracted, opening head assembly 48, and the fiber is removed.

Figure 6:
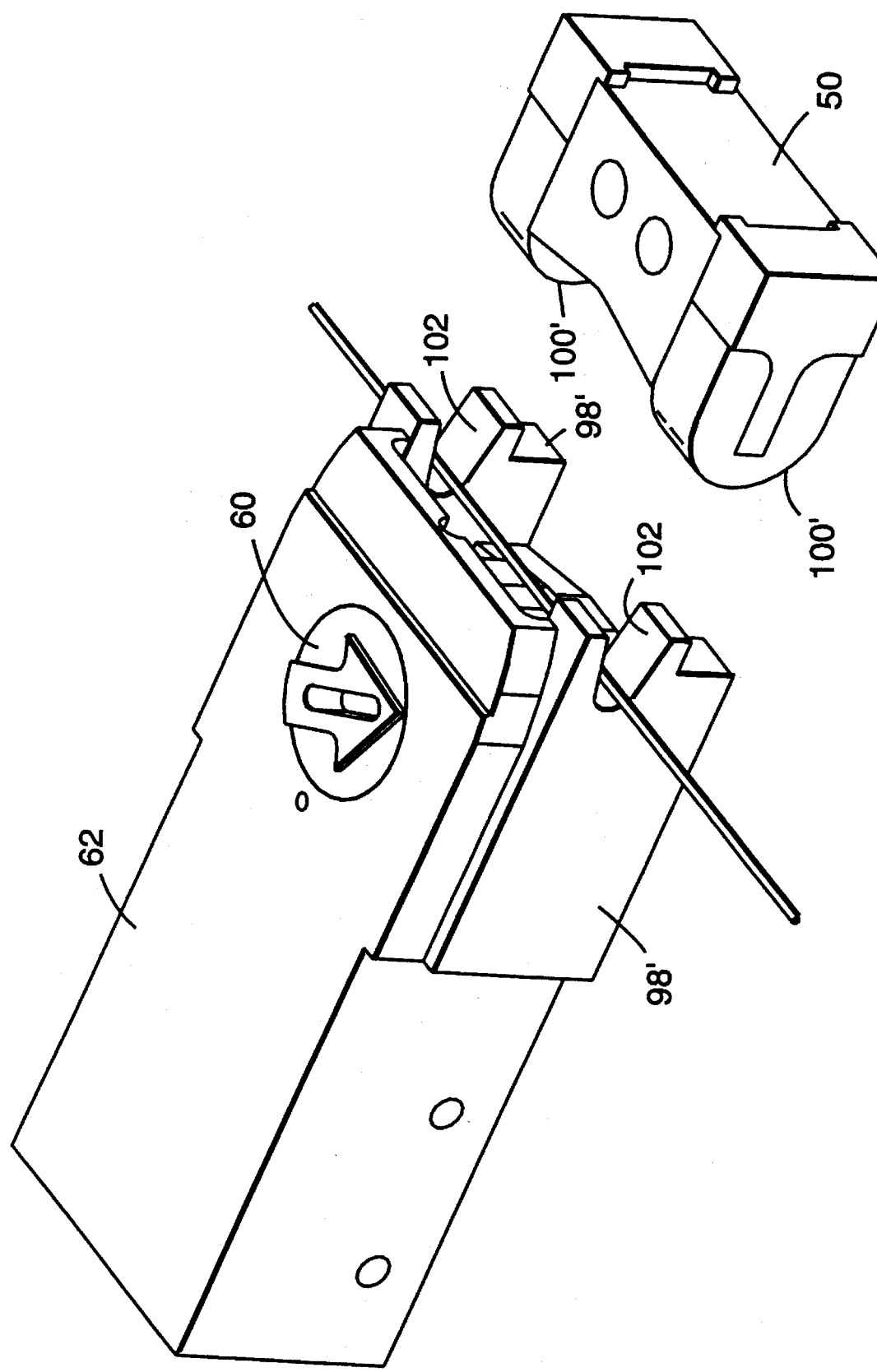
FIG. 6 is a perspective view of the head assembly showing an alternative light shield design.

Foam pieces having slightly more complicated shapes are shown in FIG. 6. In that variation, the foam strips 98' attached to either side of yoke 62 have cutouts 102 which cradle the fiber when it is placed in slot 46. When head assembly 48 is in the relaxed, closed position, cutouts 102 also surround the convex forward ends of foam strips 100' which are attached to either side of detector 50. These mating surfaces are even more effective at blocking out light which might otherwise enter head assembly 48 where the fiber enters slot 46. Foam strips 98' are preferably a silicone foam, and are softer than foam strips 100' which are preferably an open-cell, urethane foam. The use of a soft foam to conform around harder foam permits the use of a smaller compression spring 92 which extends the life of bearing assembly 78 and places less load on the user's trigger finger.

Although the invention has been described with reference to specific embodiments, this description is not meant to be construed in a limiting sense. Various modifications of the disclosed embodiment, as well as alternative embodiments of the invention, will become apparent to persons skilled in the art upon reference to the description of the invention. It is therefore contemplated that such modifications can be made without departing from the spirit or scope of the present invention as defined in the appended claims.

We claim:

1. A device for detecting the presence of an optical signal in an optical fiber, the device comprising:

a body having a slot for receiving the optical fiber;

means located within said body, proximate said slot, for detecting an optical signal;

piston means located within said body for forcibly urging a portion of the optical fiber against said detecting means, said piston means having at least two piston surfaces, a first one of said piston surfaces defining a first precision bend geometry associated with a first fiber diameter, and a second one of said piston surfaces defining a second precision bend geometry associated with a second fiber diameter; and means for selecting one of said first and second piston surfaces to urge the portion of the optical fiber against said detecting means.

2. The device of claim 1 wherein:

said piston means includes a single mandrel member having at least two surfaces, one of said surfaces being said first piston surface and the other of said surfaces being said second piston surface; and said selecting means allows said mandrel member to move between a first orientation wherein said first piston surface faces toward said detecting means, and a second orientation wherein said second piston surface faces toward said detecting means.

3. The device of claim 2 wherein:

said mandrel member has a shaft whose axis extends between said first and second piston surfaces; and said selecting means allows rotation of said mandrel member about said shaft axis to place said mandrel member in said first and second orientations.

4. The device of claim 3 wherein said mandrel member includes detent means for releasably securing said mandrel member in said first and second orientations.

5. The device of claim 1 wherein:

said detecting means includes a detector block having a first strip of opaque, compressible material attached to a first side of said detector block proximate a first end of said slot, and a second strip of opaque, compressible material attached to a second side of said detector block proximate a second end of said slot; and said piston means has a third strip of opaque, compressible material attached thereto at a first side of said piston means, said third strip having a forward end and a cutout at said forward end, and positioned such that said cutout abuts said first strip on said detector block when said piston means is urging the fiber against said detector block, and said piston means further has a fourth strip of opaque, compressible material attached thereto at a second side of said piston means, said fourth strip having a forward end and a cutout at said forward end, and positioned such that said cutout abuts said second strip on said detector block when said piston means is urging the fiber against said detector block.

6. The device of claim 5 wherein said first, second, third and fourth strips are constructed of foam materials; and said third and fourth foam strips are softer than said first and second foam strips.

7. The device of claim 2 wherein said mandrel member includes detent means for releasably securing said mandrel member in said first and second orientations.

8. The device of claim 2 wherein:

said mandrel member is mounted in a yoke;

said yoke is mounted on a carriage member; and said carriage member is slidably mounted in said body such that said mandrel member may be moved toward and away from said detecting means.

9. The device of claim 2 wherein said piston means includes means for applying a predetermined pressure against said fiber.

10. The device of claim 1 wherein said slot is tapered toward said detecting means such that the optical fiber is aligned with the vertical center of said detecting means regardless of the size of the optical fiber.

11. The device of claim 1 wherein said piston means includes means for applying a predetermined pressure against the fiber.

12. The device of claim 1 further comprising means for visually indicating which of said first and second piston surfaces has been selected.

13. The device of claim 1 wherein said selecting means allows either of said first and second piston surfaces to be selected without disassembling the device.

14. The device of claim 1 wherein said selecting means allows said mandrel member to move between said first and second orientations only when said piston means is in a retracted position away from said detecting means.

15. An instrument for detecting optical signals in optical fibers of various diameters, the instrument comprising:

a body having a forward tip, and a slot in said tip for receiving the optical fiber;

a detector block located within said forward tip of said body, proximate said slot, said detector block having means for detecting an optical signal;

a piston located within said forward tip of said body for forcibly urging a portion of the optical fiber against said detector block, said piston being movable between open and closed positions, and having at least two piston surfaces, a first one of said piston surfaces defining a first precision bend geometry adapted to urge a fiber of a first diameter against said detector block, and a second one of said piston surfaces defining a second precision bend geometry adapted to urge a fiber of a second diameter against said detector block;

means biasing said piston toward said closed position; and means for selecting one of said first and second piston surfaces to urge the portion of the optical fiber against said detector block.

16. The device of claim 15 wherein said biasing means includes means for applying said piston at a predetermined pressure against the fiber.

17. The device of claim 16 wherein:

said piston includes a single mandrel having at least two surfaces, one of said surfaces being said first piston surface and the other of said surfaces being said second piston surface; and said selecting means allows said mandrel to move between a first orientation wherein said first piston surface faces toward said detector block, and a second orientation wherein said second piston surface faces toward said detector block.

18. The device of claim 17 wherein:

said selecting means allows said mandrel member to move between said first and second orientations only when said piston is in a retracted position away from said detector block; and said mandrel includes detent means for releasably securing said mandrel in said first and second orientations, and further comprising means for visually indicating which of said first and second piston surfaces has been selected.

19. The device of claim 18 wherein:

said detector block has a first strip of opaque, compressible foam attached to a first side of said detector block proximate a first end of said slot, and a second strip of opaque, compressible foam attached to a second side of said detector block proximate a second end of said slot;

said piston has a third strip of opaque, compressible foam attached thereto at a first side of said piston, said third strip having a forward end and a cutout at said forward end, and positioned such that said cutout abuts said first strip on said detector block when said piston is urging the fiber against said detector block, and said piston further has a fourth strip of opaque, compressible foam attached thereto at a second side of said piston, said fourth strip having a forward end and a cutout at said forward end, and positioned such that said cutout abuts said second strip on said detector block when said piston is urging the fiber against said detector block; and said third and fourth foam strips are softer than said first and second foam strips.

20. A multiple-size optical fiber identifier comprising:

a body having a handle portion and a tip portion, and a slot in said tip portion for receiving an optical fiber;

a detector block located within said tip portion of said body, proximate said slot, said detector block having means for detecting an optical signal;

a piston located within said tip portion of said body, said piston being movable between open and closed positions and including a single mandrel having at least two piston surfaces, a first one of said piston surfaces defining a first precision bend geometry adapted to urge a fiber of a first diameter against said detector block, and a second one of said piston surfaces defining a second precision bend geometry adapted to urge a fiber of a second diameter against said detector block;

means biasing said piston toward said closed position, said biasing means including means for applying said piston at a predetermined pressure against the fiber;

means for selecting one of said first and second piston surfaces to urge the portion of the optical fiber against said detector block, said selecting means allowing said mandrel to move between a first orientation wherein said first piston surface faces toward said detector block, and a second orientation wherein said second piston surface faces toward said detector block, but allowing said mandrel to move between said first and second orientations only when said piston is in a retracted position away from said detector block;

detent means for releasably securing said mandrel in said first and second orientations; and means for visually indicating which of said first and second piston surfaces has been selected.

\* \* \* \* \*